UNITED STATES PATENT OFFICE 2,465,854

INSECTICIDAL COMPOSITION CONTAINING AN AROMATIC UNSATURATED CARBONYL COMPOUND

Stephen C. Dorman, Berkeley, and Seaver A. Ballard, Oakland, Calif., assignors to Shell Development Company, San Francisco, Calif., a corporation of Delaware No Drawing. Application August 26, 1944, Serial No. 551,419

4 Claims. (Cl. 167—30)

This invention relates to new and novel compounds which are particularly suitable for killing noxious insects and the like. More specifically, the invention is concerned with insecticidal compositions containing cinnamic aldehyde derivatives.

Among the best known toxicants used in insecticidal compositions, particularly in household insecticides, are pyrethrum and rotenone. These are both derived from plants grown in foreign countries and are therefore expensive and not always obtainable in desired quantities. Thus, many organic compounds which are more readily available in this country have been proposed as toxicants for insecticidal compositions. However, although many of these proposed compounds are relatively efficient for momentarily incapacitating insects, they are relatively inefficient for killing insects. In addition to the desirability of high toxic action, for use in insecticides, particularly in household insecticides, the compounds must be light-stable, compatible with light paraffinic mineral oils, such as kerosene, and free from injurious effect and offensive odor to human beings and tendency to stain walls, fabrics, etc.

It is an object of the present invention to provide an insecticidal composition which is highly toxic to insects but of low toxicity to man and other warm-blooded animals. Another object is to provide new insecticidal compositions which can be prepared from readily available domestic and inexpensive materials. A further object is to provide an improved insecticidal composition containing a fast-acting synthetic toxicant which is stable toward light. A further object of this invention is to provide an activator for toxic plant extracts such as pyrethrum and derris resin or rotenone in insecticidal compositions.

We have found that certain cinnamic aldehyde derivatives are particularly effective and highly active insecticidal agents. These compounds may be represented by the general formula

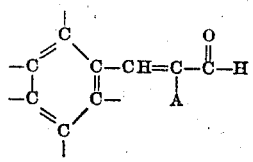

wherein A is preferably a hydrogen atom but may also be a lower hydrocarbon radical. The indicated free bonds of the ring carbon atoms may be satisfied with hydrogen atoms or lower hydrocarbon or ether radicals as well as other suitable substituents.

As examples of especially effective compounds, the following may be mentioned: cinnamic aldehyde, methyl cinnamic aldehyde, ethyl cinnamic aldehyde, dimethyl cinnamic aldehyde, amyl cinnamic aldehyde, etc.

The cinnamic aldehyde derivatives, either alone or in combination with other active or inactive substances, may be applied to plants, animals, fabrics and the like, by spraying, dusting, pouring, dipping, etc., in the form of concentrated liquids, solutions, suspensions, dusting powders, and the like, containing such concentration of the active principle as is most suited for the particular purpose at hand. They may be applied, for example, in the form of dilute solutions, in a suitable solvent or mixture of solvents, containing, for instance, acetone, petroleum distillate, lignite tar oils, hydrogenated hydrocarbons, paraffin oils, naphthenes, chlorinated hydrocarbons, chlorinethers, fenchyl and bornyl alcohols, mono- and poly-hydric alcohols, glycol ethers, or the like or mixtures thereof.

The present compounds may be advantageously used in combination with other insecticides or fungicides such as pyrethum, derris resins, rotenone, nicotine, lime-sulphur, Bordeaux mixture, copper sulfate, copper carbonates, sulphur, mercury compounds, sodium, calcium and lead arsenates, iron sulfate, phenol, paradichlorobenzene, unsaturated chlorides, higher unsaturated amides, alkene sulfides, thiuram sulfides, thiocyanates, thiocyano esters, isothiocyanates, ethylene glycol ester of pinene, butyl mesityl oxide oxalate, polyhalogenated compounds, such as 1,1-diparachlorophenyl 2,2,2-trichloroethane, unsaturated cyclic ketols, such as diisophorone and its homologues, obtained by condensation of lower ketones, such as acetone, methyl ethyl ketone, etc., according to U. S. Patent 2,307,482, and the like.

As will be readily apparent, the most desirable cinnamic aldehyde derivatives and solvent, or solvent mixture, or combination with other active and inactive ingredients, will depend considerably upon the particular use for which the material is intended.

For use in household insecticides, cinnamic aldehyde derivatives are preferably dissolved in a light hydrocarbon oil such as highly refined, odorless kerosene or kerosene distillate with or without the addition of other insecticides and sprays. Ordinarily from about 1% to 25% and preferably from 2% to 8% of the present toxicants are used in such sprays.

When solutions of the cinnamic aldehyde derivatives in odorless base kerosene are placed on filter paper and exposed to air, the liquid evaporates leaving substantially no stain behind, which feature is of particular advantage in household insecticides.

The present compounds may also be mixed with or absorbed by finely divided solid materials, such as wood flour, talc, clay, bentonite, sulphur, and carbon black, and used as dusting insecticides.

Modified Peet-Grady tests were made with the cinnamic aldehyde derivatives of the present invention. The general test is fully described in the 1940 "Blue Book," published by the publisher of "Soap and Sanitary Chemicals" periodical, on pages 193 to 197, as the large group method. Briefly the test as practiced consists of releasing 100 to 150 flies in an air-conditioned case 6 x 6 x 6 feet and spraying them with 6 ml. of insecticide. After 10 minutes exposure the number of flies which are incapacitated or "knocked down" is noted and all flies transferred to a cage and allowed to recuperate in fresh air for 24 hours, when the dead flies are counted. For the purpose of this study the percentages knocked down at 10 minutes and killed at 24 hours were recorded, as well as the official Peet-Grady numeral rating. The results obtained by testing in the above manner several of the present cinnamic aldehyde derivatives in highly refined, odorless kerosene with added pyrethrum are given in the following table:

| Agent | Amt. of Agent | Vol. of Pyrethrum Extract | 10 min. Knockdown | 24 hr. Kill | Numerical Rating [1] |
|---|---|---|---|---|---|
| | Per cent by volume | Per cent | Per cent | Per cent | |
| Cinnamic aldehyde | 3 | 5 | 99 | 77 | +35 |
| Amyl cinnamic aldehyde | 5 | 5 | 99 | 95 | +44 |

[1] The numerical rating is calculated as the difference in the per cent 24 hour kill from that obtained with an odorless kerosene solution of 5 per cent by volume of 20:1 pyrethrum extract concentrate.

Besides the control of houseflies (Musca domestica), the compositions containing the present cinnamic aldehyde derivatives may be used for eradicating or controlling various pests, such as insects, e. g., aphids, diabrotica, red spiders, thrips, etc., bacteria and fungi, such as *Aspergillus, Penicillium, Sclerotium rolfsii*, etc.

We claim as our invention:

1. A household insecticide comprising a light hydrocarbon oil and a cinnamic aldehyde having an amyl radical attached to the benzene ring therein.

2. An insecticidal composition comprising a mineral spray oil, an emulsifying agent and an amyl cinnamic aldehyde.

3. An insecticidal composition comprising a light hydrocarbon oil and, as active insecticidal ingredient, an alkylated benzylidine aliphatic aldehyde.

4. An insecticidal composition comprising a light hydrocarbon oil and a cinnamic aldehyde having an alkyl radical attached to the benzene ring therein.

STEPHEN C. DORMAN.
SEAVER A. BALLARD.

REFERENCES CITED

The following references are of record in the file of this patent:

UNITED STATES PATENTS

| Number | Name | Date |
|---|---|---|
| 2,046,961 | Mills | July 7, 1936 |
| 2,155,356 | Britton et al. | Apr. 18, 1939 |

FOREIGN PATENTS

| Number | Country | Date |
|---|---|---|
| 197,510 | Switzerland | Aug. 1, 1938 |

OTHER REFERENCES

Merck's Index, 4th Ed. (1930), page 190.
Dictionary of Organic Compounds, by Heilbron, 1934 Ed., vol. 1, page 344.